United States Patent
Husband et al.

(10) Patent No.: US 11,149,648 B2
(45) Date of Patent: Oct. 19, 2021

(54) METHODS AND APPARATUS FOR CONTROLLING AT LEAST PART OF A START-UP OR RE-LIGHT PROCESS OF A GAS TURBINE ENGINE

(71) Applicant: ROLLS-ROYCE plc, London (GB)

(72) Inventors: Stephen M. Husband, Derby (GB); Ahmed M Y Razak, Bristol (GB); Paul R. Miller, Derby (GB)

(73) Assignee: Rolls-Royce plc

( * ) Notice: Subject to any disclaimer, the term of this patent is extended or adjusted under 35 U.S.C. 154(b) by 115 days.

(21) Appl. No.: 16/679,576

(22) Filed: Nov. 11, 2019

(65) Prior Publication Data

US 2020/0173368 A1 Jun. 4, 2020

(30) Foreign Application Priority Data

Dec. 3, 2018 (GB) .................................... 1819695

(51) Int. Cl.
*F02C 7/262* (2006.01)
*F02C 7/266* (2006.01)

(52) U.S. Cl.
CPC .............. *F02C 7/262* (2013.01); *F02C 7/266* (2013.01); *F05D 2260/85* (2013.01)

(58) Field of Classification Search
CPC .. F02C 7/262; F02C 7/266; F02C 7/26; F01D 19/00
See application file for complete search history.

(56) References Cited

U.S. PATENT DOCUMENTS

| 5,114,103 A | 5/1992 | Coffinberry |
| 5,442,907 A * | 8/1995 | Asquith ................ F02C 7/262 60/39.091 |

(Continued)

FOREIGN PATENT DOCUMENTS

| EP | 1619370 | 1/2006 |
| EP | 1908941 | 4/2008 |

(Continued)

OTHER PUBLICATIONS

Great Britain search report dated Aug. 14, 2018, issued in GB Patent Application No. 1803038.7.

(Continued)

*Primary Examiner* — Katheryn A Malatek
(74) *Attorney, Agent, or Firm* — Barnes & Thornburg LLP

(57) ABSTRACT

A method of controlling at least part of a start-up or re-light process of a gas turbine engine, the method comprising: controlling ignition within a combustion chamber of the gas turbine engine; controlling rotation of a low pressure compressor using a first electrical machine, and controlling rotation of a high pressure compressor using a second electrical machine, the combustion chamber downstream of the low pressure compressor and high pressure compressor; determining if an exit pressure of the high pressure compressor is equal to or greater than a self-sustaining threshold pressure; and in response to determining that the exit pressure of the high pressure compressor is equal to or greater than the self-sustaining threshold pressure, ceasing controlling rotation of the low pressure compressor using the first electrical machine, and/or the high pressure compressor using a second electrical machine.

14 Claims, 8 Drawing Sheets

(56) References Cited

U.S. PATENT DOCUMENTS

| | | | |
|---|---|---|---|
| 6,035,626 A | 3/2000 | Wahl et al. | |
| 2005/0056021 A1 | 3/2005 | Belokon et al. | |
| 2006/0042252 A1* | 3/2006 | Derouineau | F02C 9/26 60/703 |
| 2006/0272313 A1* | 12/2006 | Eick | F02C 3/107 60/39.63 |
| 2007/0151258 A1* | 7/2007 | Gaines | F02K 3/06 60/792 |
| 2008/0072568 A1* | 3/2008 | Moniz | F01D 25/34 60/226.1 |
| 2012/0000204 A1 | 1/2012 | Kesseli et al. | |
| 2013/0183136 A1 | 7/2013 | Roberge et al. | |
| 2013/0192195 A1 | 8/2013 | Wehmeier | |
| 2016/0138475 A1 | 5/2016 | Hield et al. | |
| 2016/0195025 A1 | 7/2016 | Ajami et al. | |
| 2018/0112599 A1 | 4/2018 | Dalal | |

FOREIGN PATENT DOCUMENTS

| | | |
|---|---|---|
| EP | 3219964 | 9/2017 |
| WO | 9502120 | 1/1995 |

OTHER PUBLICATIONS

Great Britain search report dated Aug. 23, 2018, issued in GB Patent Application No. 1803039.5.
Great Britain search report dated May 24, 2018, issued in GB Patent Application No. 1819694.9.
Great Britain search report dated May 24, 2018, issued in GB Patent Application No. 1819696.4.
Great Britain search report dated May 24, 2018, issued in GB Patent Application No. 1819695.6.
European search report dated Jul. 2, 2019, issued in EP Patent Application No. 19154197.
European search report dated Sep. 19, 2018, issued in EP Patent Application No. 19154199.
Extended EP Search Report completed Apr. 9, 2020 and issued in connection with EP Patent Appln. No. 19207994.5, 8 pages.
Extended EP Search Report completed Apr. 14, 2020 and issued in connection with EP Patent Appln. No. 19207987.9, 5 pages.
Extended European Search Report, European Application No. 19207992.9-1007, dated Apr. 8, 2020, 6 pages.

* cited by examiner

METHODS AND APPARATUS FOR CONTROLLING AT LEAST PART OF A START-UP OR RE-LIGHT PROCESS OF A GAS TURBINE ENGINE

CROSS-REFERENCE TO RELATED APPLICATIONS

This specification is based upon and claims the benefit of priority from United Kingdom Patent Application Number 1819695.6 filed on 3 Dec. 2018, the entire contents of which are incorporated herein by reference.

BACKGROUND

Technical Field

The present disclosure relates to methods and apparatus for controlling at least part of a start-up or re-light process of a gas turbine engine.

Description of the Related Art

Gas turbine engines usually have a start-up or re-light process in which the angular velocity of a high pressure compressor is increased prior to ignition within the combustion chamber of the gas turbine engine. At low speeds, the high pressure compressor may experience a disturbance known as a 'front end stall'. If the front end stall degenerates into a single cell rotating stall, the start-up or re-light process may be delayed, or may have to be aborted.

To prevent front end stall of the high pressure compressor, a start bleed in the high pressure compressor may be used to exhaust air from the high pressure compressor, thereby enabling higher flow at the front stages of the high pressure compressor whilst preventing choking at the rear stages of the high pressure compressor. However, the start bleed may increase the noise output of the gas turbine engine during the start-up or re-light process, and may add weight to the gas turbine engine, reducing brake specific fuel consumption.

SUMMARY

According to a first aspect, there is provided a method of controlling at least part of a start-up or re-light process of a gas turbine engine, the method comprising: controlling ignition within a combustion chamber of the gas turbine engine; controlling rotation of a low pressure compressor using a first electrical machine, and controlling rotation of a high pressure compressor using a second electrical machine, the combustion chamber downstream of the low pressure compressor and high pressure compressor; determining if an exit pressure of the high pressure compressor is equal to or greater than a self-sustaining threshold pressure; and in response to determining that the exit pressure of the high pressure compressor is equal to or greater than the self-sustaining threshold pressure, ceasing controlling rotation of the low pressure compressor using the first electrical machine, and/or the high pressure compressor using a second electrical machine, such that operation of the gas turbine engine is sustained by air drawn through the gas turbine engine.

The rotation of the low pressure compressor and the high pressure compressor may be controlled to increase the residence time of fuel in the combustion chamber.

Controlling rotation of a low pressure compressor using a first electrical machine, and controlling rotation of a high pressure compressor using a second electrical machine may comprise: applying a maximum torque to the low pressure compressor from the first electrical machine.

Controlling rotation of a low pressure compressor using a first electrical machine, and controlling rotation of a high pressure compressor using a second electrical machine may further comprise: restricting rotation of the high pressure compressor using the second electrical machine.

Rotation of the high pressure compressor may be, at least in part, driven by expansion of combustion products from the combustion chamber through a turbine, the turbine driving a shaft interconnecting the turbine and the high pressure compressor. Controlling rotation of a low pressure compressor using a first electrical machine, and controlling rotation of a high pressure compressor using a second electrical machine may comprise: after applying maximum torque to the low pressure compressor: determining the flame is self-sustaining in the combustion chamber; and controlling the first and second electrical machines to neither drive the low pressure compressor or high pressure compressor nor function as generators.

Controlling rotation of a low pressure compressor using a first electrical machine, and controlling rotation of a high pressure compressor using a second electrical machine may further comprise: applying a maximum torque to the high pressure compressor from the second electrical machine.

The method may further comprise, in response to determining that the exit pressure of the high pressure compressor is equal to or greater than the self-sustaining threshold pressure, operating the first and/or second electrical machines as generators.

The high and low pressure compressors may be driven by respective high and low pressure turbines. The turbines may be driven by expansion of combustion products from the combustions chamber. The method may further comprise reducing the torque applied by the first and second electrical machines as the torque applied by the high and low pressure turbines increase.

The method may comprise: monitoring one or more engine parameters during the method, the one or more engine parameters selected from a list comprising at least: entry pressure of the low pressure compressor; exit pressure of the low pressure compressor; entry temperature of the low pressure compressor; exit temperature of the low pressure compressor; entry pressure of the high pressure compressor; exit pressure of the high pressure compressor; entry temperature of the high pressure compressor; and exit temperature of the high pressure compressor.

Controlling rotation of the low and high pressure compressor using the second electrical machine may comprise: varying angular velocity of the high and/or low pressure compressor based in at least one of the one or more engine parameters.

The method may comprise at least part of a re-light procedure at an altitude above sea level, during flight.

According to a second aspect, there is provided a computer program that, when read by a computer, causes performance of the method according to the first aspect.

According to a third aspect there is provided a non-transitory computer readable storage medium comprising computer readable instructions that, when read by a computer, cause performance of the method according to the first aspect.

According to a fourth aspect, there is provided an apparatus for controlling at least a part of a start-up or re-light process of a gas turbine engine, the apparatus comprising a controller configured to perform the method according to the first aspect.

According to a fifth aspect there is provided a method of controlling at least part of a start-up or re-light process of a gas turbine engine, the method comprising: increasing an angular velocity of a low pressure compressor; determining if an exit pressure of the low pressure compressor is equal to or greater than a first threshold pressure; in response to determining that the exit pressure of the low pressure compressor is equal to or greater than the first threshold pressure, controlling rotation of the low pressure compressor using a first electrical machine and controlling rotation of a high pressure compressor using a second electrical machine, to increase angular velocity of the high pressure compressor; determining if an exit pressure of the high pressure compressor is equal to or greater than a second threshold pressure; and in response to determining that the exit pressure of the high pressure compressor is equal to or greater than the second threshold pressure, controlling ignition within a combustion chamber of the gas turbine engine, the combustion chamber downstream of the low pressure compressor and high pressure compressor.

Increasing the angular velocity of the low pressure compressor may comprise controlling rotation of the low pressure compressor using the first electrical machine to increase the angular velocity of the low pressure compressor and controlling rotation of the high pressure compressor using the second electrical machine to restrict angular velocity of the high pressure compressor.

Increasing the angular velocity of the low pressure compressor, whilst restricting angular velocity of the high pressure compressor may increase the exit pressure of the high pressure compressor Increasing the exit pressure of the high pressure compressor may increase a surge threshold of the gas turbine engine above an operating line of the gas turbine engine.

Prior to the exit pressure of the low pressure compressor reaching the first threshold, the angular velocity of the low pressure compressor may be accelerated to a low pressure compressor threshold velocity. The method further may comprise: controlling rotation of the low pressure compressor such that the angular velocity of the low pressure compressor is at or below the low pressure compressor threshold velocity for at least a portion of the step of controlling rotation of the high pressure compressor using the second electrical machine, to increase angular velocity of the high pressure compressor.

The angular velocity of the low pressure compressor may be reduced prior to the step of controlling rotation of the high pressure compressor using the second electrical machine to increase angular velocity of the high pressure compressor.

The angular velocity of the low pressure compressor may be reduced during the step of controlling rotation of the high pressure compressor using the second electrical machine, to increase angular velocity of the high pressure compressor.

The method may comprise controlling rotation of the low pressure compressor to increase the angular velocity of the low pressure compressor for at least a portion of the step of controlling rotation of the high pressure compressor using the second electrical machine, to increase angular velocity of the high pressure compressor.

The method may comprise: controlling rotation of the high pressure compressor using the second electrical machine, to increase angular velocity of the high pressure compressor to a high pressure compressor threshold velocity; controlling rotation of the high pressure compressor using the second electrical machine, to maintain the angular velocity of the high pressure compressor at the high pressure compressor threshold velocity; whilst the angular velocity of the high pressure compressor is held at the high pressure compressor threshold velocity, controlling rotation of the low pressure compressor using the first electrical machine to vary the angular velocity of the low pressure compressor.

The method may comprise monitoring one or more engine parameters during the method, the one or more engine parameters selected from a list comprising at least: entry pressure of the low pressure compressor; exit pressure of the low pressure compressor; entry temperature of the low pressure compressor; exit temperature of the low pressure compressor; entry pressure of the high pressure compressor; exit pressure of the high pressure compressor; entry temperature of the high pressure compressor; and exit temperature of the high pressure compressor.

Controlling rotation of the high pressure compressor using the second electrical machine may comprise: varying angular velocity of the high pressure compressor based on at least one of the one or more engine parameters.

The method may include, whilst controlling rotation of the high pressure compressor using the second electrical machine, controlling rotation of the low pressure compressor using the first electrical machine, based on at least one of the one or more engine parameters.

The method may comprise, whilst controlling rotation of the high pressure compressor using the second electrical machine, controlling the position of one or more variable guide vanes, to control flow of air into the low pressure compressor.

According to a sixth aspect, there is provided a computer program that, when read by a computer, causes performance of the method of the fifth aspect.

According to a seventh aspect, there is provided a non-transitory computer readable storage medium comprising computer readable instructions that, when read by a computer, cause performance of the method of the fifth aspect.

According to an eighth aspect, there is provided an apparatus for controlling at least a part of a start-up or re-light process of a gas turbine engine, the apparatus comprising a controller configured to perform the method of the fifth aspect.

According to a ninth aspect, there is provided a method of controlling at least part of a start-up or re-light process of a gas turbine engine, the method comprising: determining when a flame in a combustion chamber of a gas turbine engine is extinguished, during a start-up process or re-light process or during operation; purging the combustion chamber by controlling rotation of a low pressure compressor using a first electrical machine, and controlling rotation of a high pressure compressor using a second electrical machine, the combustion chamber downstream of the low pressure compressor and high pressure compressor; and controlling rotation of the low pressure compressor using the first electrical machine, and controlling rotation of the high pressure compressor using the second electrical machine to restart the start-up process or perform the re-light process.

The gas turbine engine may comprise: a first shaft arranged to drive the low pressure compressor; a second shaft arranged to drive the high pressure compressor; and a fan driven by the first shaft.

The fan may be coupled to the first shaft by a gearbox.

The start-up or re-light process may include controlling rotation of the low pressure compressor using the first electrical machine and controlling rotation of the high pressure compressor using the second electrical machine, and wherein determining when a flame in a combustion chamber of a gas turbine engine is extinguished comprises: measuring a change in one or more of: a torque applied by the first electrical machine; a torque applied by the second electrical machine; an angular velocity of the first shaft; and an angular velocity of the second shaft.

The method may further comprise: controlling rotation of the low pressure compressor using the first electrical machine, to maintain the angular velocity of the first shaft above a first threshold angular velocity.

The first threshold angular velocity may be sufficient to prevent windmilling of the fan.

The method may further comprise: controlling rotation of the high pressure compressor using the second electrical machine, to maintain the angular velocity of the second shaft above a second threshold angular velocity.

According to a tenth aspect, there is provided a computer program that, when read by a computer, causes performance of the method according to the ninth aspect.

According to an eleventh aspect, there is provided a non-transitory computer readable storage medium comprising computer readable instructions that, when read by a computer, cause performance of the method according to the ninth aspect.

According to a twelfth aspect, there is provided an apparatus for controlling at least a part of a start-up or re-light process of a gas turbine engine, the apparatus comprising a controller configured to perform the method according to the ninth aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
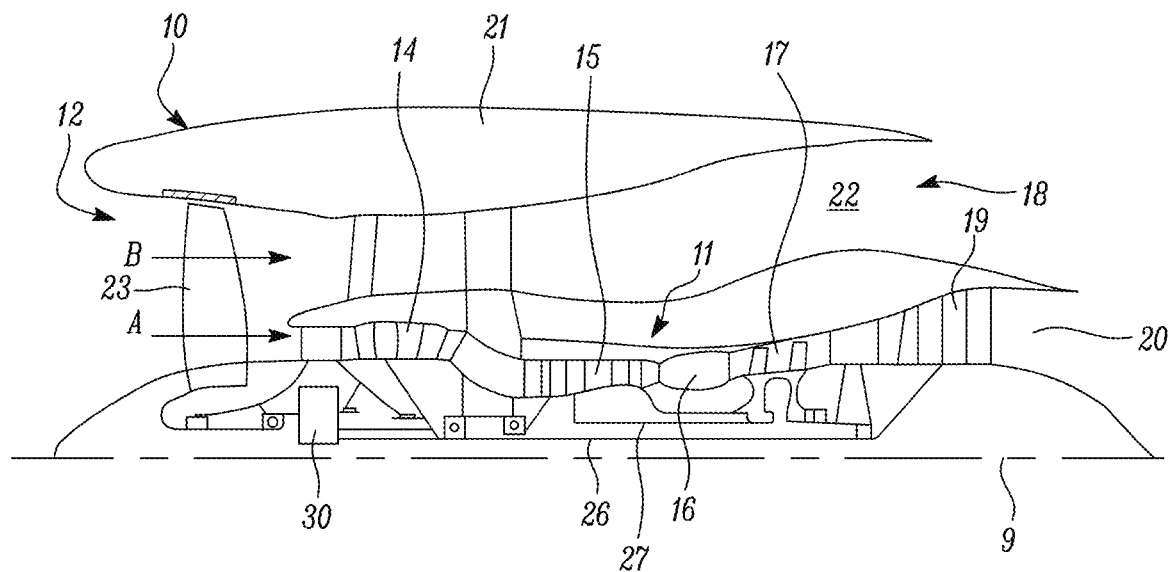
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16 including a combustion chamber, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox and enables the fan 23 to rotate at a lower rotational speed than the low pressure turbine 40.

Additionally or alternatively, the gearbox 30 may drive additional and/or alternative components (e.g. the low pressure compressor 32 and/or a booster compressor, or a propeller (aero or hydro)). In some examples, the gearbox 30 may drive an electrical generator instead of the fan 23, and may be a speed increasing gearbox.

Figure 2:
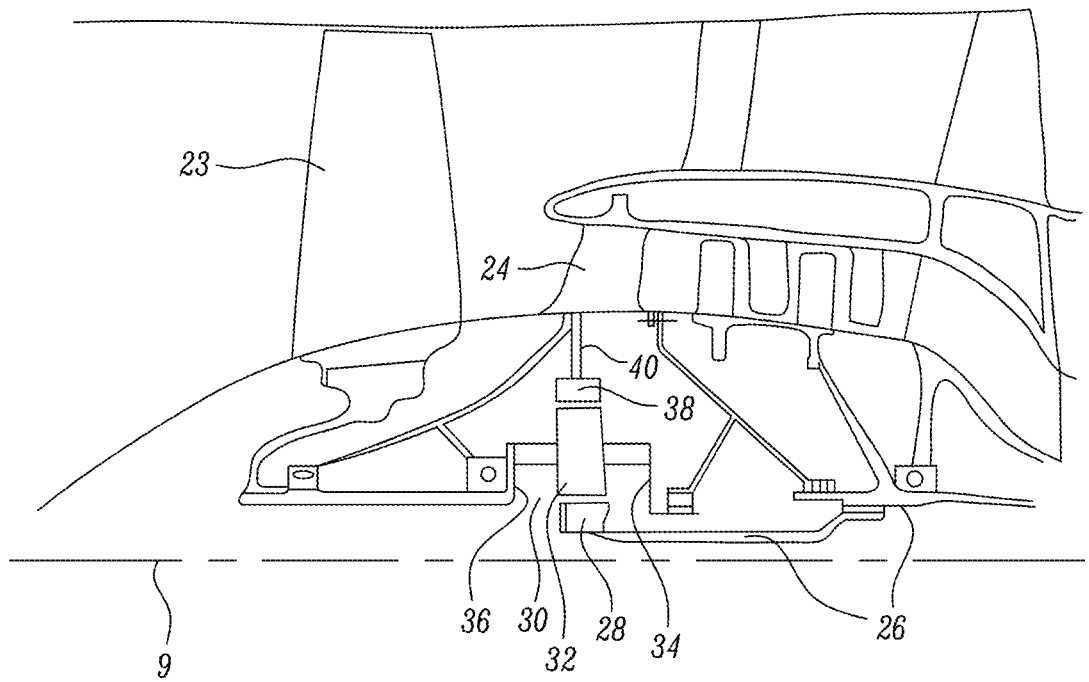
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Each of the low pressure compressor 14, high pressure compressor 15, high pressure turbine 17 and low pressure turbine 19 comprises one or more fans (not shown), also referred to as rotors. The rotors in the low pressure compressor 14 and low pressure turbine 19 are mounted on the first shaft 26, whilst the rotors in the high pressure compressor 15 and high pressure turbine 17 are mounted on the second shaft 27. The rotation speed of the rotors is referred to as the angular velocity of the low pressure compressor 14 or the high pressure compressor 15.

In some cases, the low pressure compressor 14, high pressure compressor 15, high pressure turbine 17 and low pressure turbine 19 may include multiple fans in axial flow series, each fan forming a stage within the respective low pressure compressor 14, high pressure compressor 15, high pressure turbine 17 and low pressure turbine 19. Each stage may also include a set of fixed vanes (stators).

The rotors or stators may be formed as fan discs with aerofoil blades mounted on them, or as blisks.

In use, the expansion of combustions gasses drives rotation of the rotor stages in the high pressure turbine 17 and low pressure turbine 19. This in turn drives rotation of the correspond shaft 26, 27, which drives rotation of the respective rotors in the low pressure compressor 14 and high pressure compressor 15. The compressors 14, 15 compress the air passing through the core flow A.

The low pressure compressor 14 and high pressure compressor 15 have a maximum speed (angular velocity) at which they can rotate. The maximum rated speed is dependent on a number of design parameters of the engine, and can vary in different operating conditions. For example, a variation in ambient temperature can vary the maximum speed. The maximum rated speed is not a physical threshold of the engine 10, and the compressors 14, 15 can rotate at higher speed. The maximum rated speed can thus be considered a nominal threshold speed of the engine 10.

Figure 3:
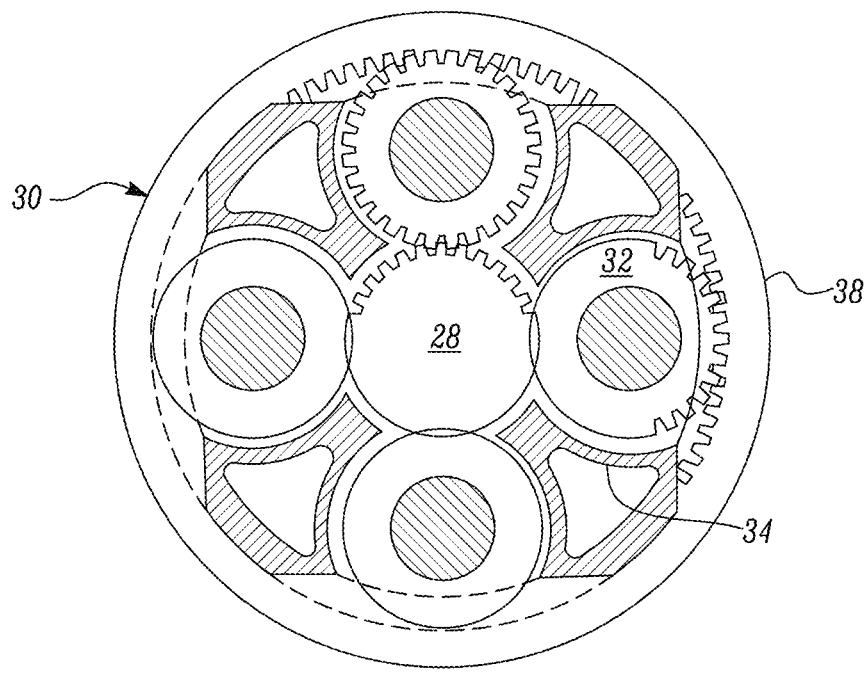
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30 and may instead comprise direct drive between the low pressure turbine 19 and the fan 22.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
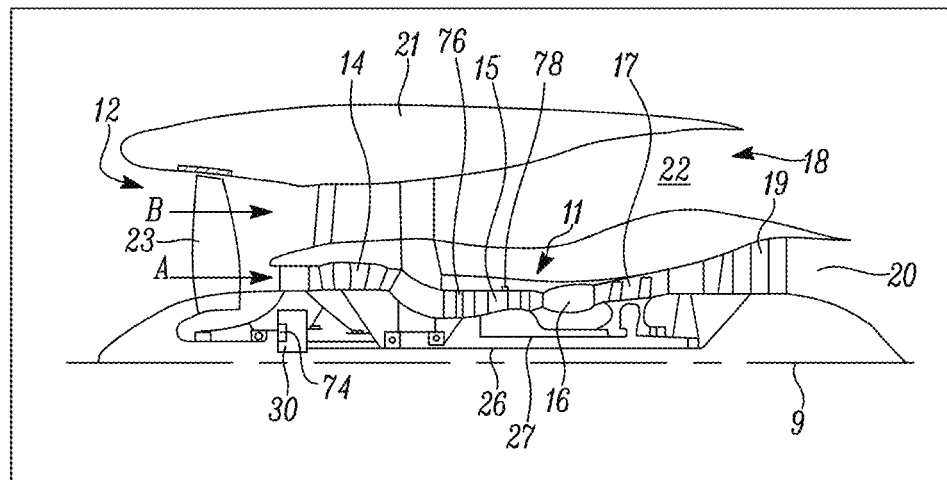
FIG. 4 illustrates a schematic diagram of apparatus for controlling at least a part of a start-up or re-light process of a gas turbine engine according to various examples.
Figure 4:
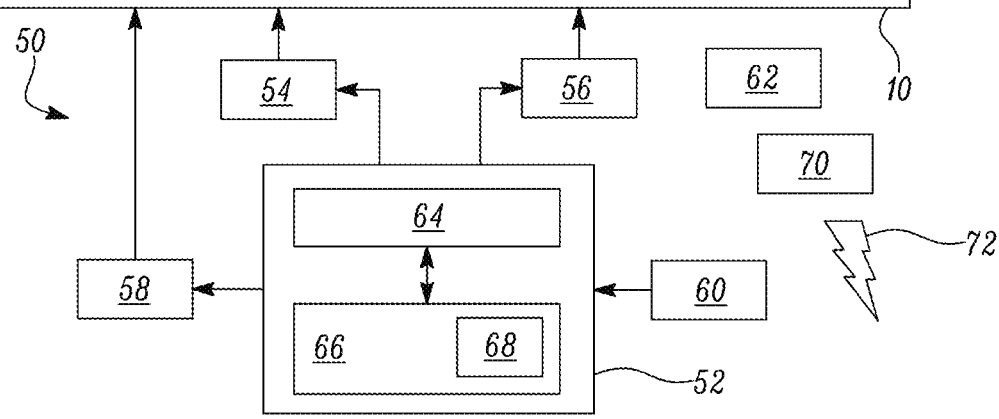

FIG. 4 illustrates an apparatus 50 for controlling at least a part of a start-up or re-light process of a gas turbine engine 10 according to various examples. The apparatus 50 includes a controller 52, a first electrical machine 54, a second electrical machine 56, an actuator arrangement 58, a sensor arrangement 60, and a load 62.

In some examples, the apparatus 50 may be a module. As used herein, the wording 'module' refers to a device or apparatus where one or more features are included at a later time and, possibly, by another manufacturer or by an end user. For example, where the apparatus 50 is a module, the apparatus 50 may only include the controller 52, and the remaining features (such as the first electrical machine 54, the second electrical machine 56, the actuator arrangement 58, the sensor arrangement 60, and the load 62) may be added by another manufacturer, or by an end user.

The controller 52, the first electrical machine 54, the second electrical machine 56, the actuator arrangement 58, and the sensor arrangement 60 may be coupled to one another via a wireless link and may comprise transceiver circuitry and one or more antennas. Additionally or alternatively, the controller 52, the first electrical machine 54, the second electrical machine 56, the actuator arrangement 58, and the sensor arrangement 60 may be coupled to one another via a wired link and may comprise connectors (such as a Universal Serial Bus (USB) socket). It should be appreciated that the controller 52, the first electrical machine 54, the second electrical machine 56, the actuator arrangement 58, and the sensor arrangement 60 may be coupled to one another via any combination of wired and wireless links.

The controller 52 may comprise any suitable circuitry to cause performance of the methods described herein and as illustrated in FIGS. 5, 7, 9, 10 and 11. The controller 52 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. In some examples, the controller 52 may be a Full Authority Digital Engine Controller (FADEC), an electronic engine controller (EEC) or an engine control unit (ECU).

In various examples, the controller 52 may comprise at least one processor 64 and at least one memory 66. The memory 66 stores a computer program 68 comprising computer readable instructions that, when read by the processor 64, causes performance of the methods described herein, and as illustrated in FIGS. 5, 7, 9, 10 and 11. The computer program 68 may be software or firmware, or may be a combination of software and firmware.

The processor 64 may be located on the gas turbine engine 10, or may be located remote from the gas turbine engine 10, or may be distributed between the gas turbine engine 10 and a location remote from the gas turbine engine 10. The processor 64 may include at least one microprocessor and may comprise a single core processor, may comprise multiple processor cores (such as a dual core processor or a quad core processor), or may comprise a plurality of processors (at least one of which may comprise multiple processor cores).

The memory 66 may be located on the gas turbine engine 10, or may be located remote from the gas turbine engine 10, or may be distributed between the gas turbine engine 10 and a location remote from the gas turbine engine 10. The memory 66 may be any suitable non-transitory computer readable storage medium, data storage device or devices, and may comprise a hard disk and/or solid state memory (such as flash memory). The memory 66 may be permanent non-removable memory, or may be removable memory (such as a universal serial bus (USB) flash drive or a secure digital card). The memory 66 may include: local memory employed during actual execution of the computer program; bulk storage; and cache memories which provide temporary storage of at least some computer readable or computer usable program code to reduce the number of times code may be retrieved from bulk storage during execution of the code.

The computer program 68 may be stored on a non-transitory computer readable storage medium 70. The computer program 68 may be transferred from the non-transitory computer readable storage medium 70 to the memory 66. The non-transitory computer readable storage medium 70 may be, for example, a USB flash drive, a secure digital (SD) card, an optical disk (such as a compact disc (CD), a digital versatile disc (DVD) or a Blu-ray disc). In some examples, the computer program 68 may be transferred to the memory 66 via a signal 72 (such as a wireless signal or a wired signal).

Input/output devices may be coupled to the controller 52 either directly or through intervening input/output controllers. Various communication adaptors may also be coupled to the controller 52 to enable the apparatus 50 to become coupled to other apparatus or remote printers or storage devices through intervening private or public networks. Non-limiting examples include modems and network adaptors of such communication adaptors.

The first electrical machine 54 is configured to control the angular velocity of the low pressure compressor 14. The first electrical machine 54 may be mounted directly on the shaft 26 (for example, a rotor of the first electrical machine 54 may be fastened to, and abut the shaft 26). Alternatively, the first electrical machine 54 may be mounted at a location remote from the shaft 26 (such as on a core casing, or on a fan casing) and may be coupled to the shaft 26 via gearing and one or more further shafts. Alternatively, the shaft 26 may include a portion that forms the rotor of the first electrical machine 54 (that is, the rotor of the first electrical machine 54 may be integral with and a part of the shaft 26).

The controller 52 is configured to control the operation of the first electrical machine 54. For example, the controller 52 may control the supply of electrical power to the first electrical machine 54 to cause the first electrical machine 54 to function as an electrical motor. By way of another example, the controller 52 may connect the first electrical machine 54 to the load 62 to enable the first electrical machine 54 to function as an electrical generator.

The second electrical machine 56 is configured to control the angular velocity (speed) of the high pressure compressor 15. The second electrical machine 56 may be mounted directly on the shaft 27 (for example, a rotor of the second electrical machine 56 may be fastened to, and abut the shaft 27). Alternatively, the second electrical machine 56 may be mounted at a location remote from the shaft 27 (such as on a core casing, or on a fan casing) and coupled to the shaft 27 via gearing and one or more further shafts. Alternatively, the shaft 27 may include a portion that forms the rotor of the second electrical machine 56 (that is, the rotor of the second electrical machine 56 may be integral with and a part of the shaft 27).

The controller 52 is configured to control the operation of the second electrical machine 56. For example, the controller 52 may control the supply of electrical power to the second electrical machine 56 to cause the second electrical machine 56 to function as an electrical motor. By way of another example, the controller 52 may connect the second electrical machine 56 to a load to enable the second electrical machine 56 to function as an electrical generator.

The actuator arrangement 58 may comprise any suitable actuator or actuators for enabling control of at least a part of the gas turbine engine 10. For example, the actuator arrangement 58 may comprise one or more servo motors and/or one or more solenoid valves. The controller 52 is configured to control the operation of the actuator arrangement 58.

For example, where the fan 23 is a variable pitch fan, the actuator arrangement 58 may include a servo motor for varying the pitch of the fan (for example, between an idle position and an operational position). In another example, where the gearbox 30 includes a clutch 74, the actuator arrangement 58 may include a servo motor for moving the clutch 74 between a first position that connects the fan 23 to the low pressure turbine 19, and a second position that disconnects the fan 23 from the low pressure turbine 19. In a further example, the actuator arrangement 58 may include a servo motor for moving a member (such as a vane) to restrict airflow B through the bypass duct 22. In another example, the actuator arrangement 58 may include a servo motor for moving a plurality of vanes 76 within the high pressure compressor 15 between an open position and a closed position. In a further example, the actuator arrangement 58 may include one or more solenoid valves for opening and closing one or more bleed ports 78 of the high pressure compressor 15.

The sensor arrangement 60 may include any suitable sensor or sensors for sensing one or more properties of the gas turbine engine 10. For example, the sensor arrangement 60 may include a first sensor for sensing the angular velocity of the low pressure compressor 14 and a second sensor for sensing the angular velocity of the high pressure compressor 15. The controller 52 is configured to receive data from the sensor arrangement 60.

The load 62 may comprise an electrical network that is configured to use and/or store electrical power generated by at least the second electrical machine 56. For example, the load 62 may include an electrical energy storage device (such as a battery or a supercapacitor) that is configured to store electrical energy generated by at least the second electrical machine 56. By way of another example, the load 62 may alternatively or additionally comprise one or more electronic devices that operate using the electrical power supplied from at least the second electrical machine 56.

Figure 5:
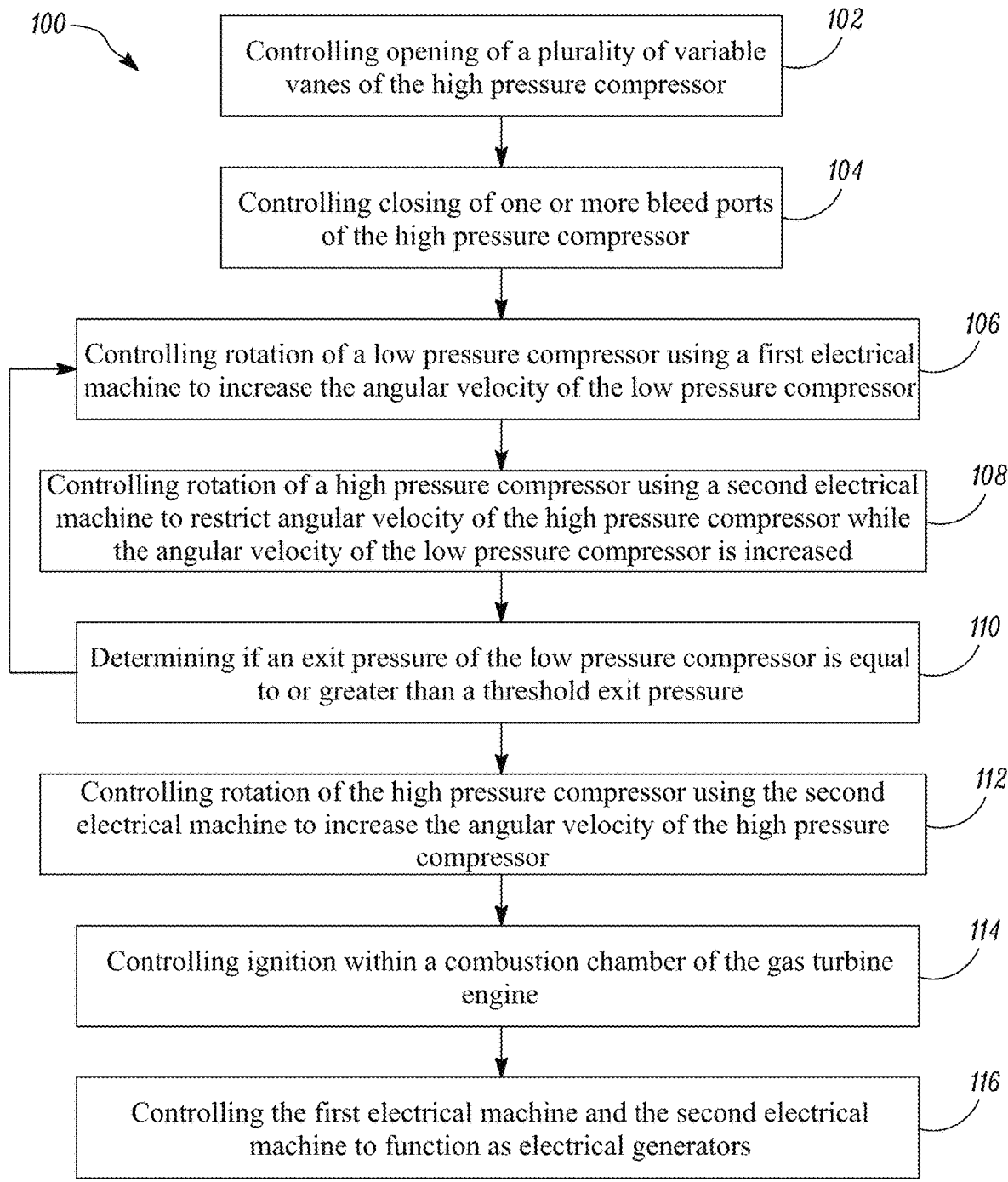
FIG. 5 illustrates a flow diagram of a method of controlling at least a part of a start-up or re-light process of a gas turbine engine according to a first example.

FIG. 5 illustrates a flow diagram of a method 100 of controlling at least a part of a start-up or re-light process of a gas turbine engine 10 according to a first example.

At block 102, the method 100 may include controlling opening of a plurality of variable vanes 76 of the high pressure compressor 15. For example, the controller 52 may control the actuator arrangement 58 to open a plurality of variable inlet guide vanes (VIGVs) and/or a plurality of variable stator vanes (VSVs) of the high pressure compressor 15.

At block 104, the method 100 may include controlling closing one or more bleed ports 78 of the high pressure compressor 15. For example, the controller 52 may control the actuator arrangement 58 to close one or more of the bleed ports 78 of the high pressure compressor 15.

At block 106, the method 100 includes controlling rotation of the low pressure compressor 14 using the first electrical machine 54 to increase the angular velocity of the low pressure compressor 14. For example, the controller 52 may control the supply of electrical power to the first electrical machine 54 to enable the first electrical machine 54 to function as an electrical motor to increase the angular velocity of the low pressure compressor 14 (in other words, the controller 52 controls the first electrical machine 54 to drive the low pressure compressor 14 to accelerate the low pressure compressor 14). In operation, the rotation of the low pressure compressor 14 increases the pressure at the entrance of the high pressure compressor 15 to a pressure above ambient pressure.

At block 108, the method 100 includes controlling rotation of the high pressure compressor 15 using the second electrical machine 56 to restrict the angular velocity of the high pressure compressor 15 while the angular velocity of the low pressure compressor 14 is being increased by the first electrical machine 54.

For example, the controller 52 may control the second electrical machine 56 to apply a braking force to the shaft 27, to restrict the angular velocity of the high pressure compressor 15. In an alternative example, the controller 52 may connect the second electrical machine 56 to the load 62 to enable the second electrical machine 56 to function as an electrical generator and thus extract energy from the high pressure compressor 15. By way of another example, the controller 52 may connect the output from the second electrical machine 56 to the input of the first electrical machine 54 to enable the second electrical machine 56 to function as an electrical generator and provide electrical power to the first electrical machine 54 to drive the low pressure compressor 14. In some examples, the controller 52 may control the angular acceleration of the high pressure compressor 15 so that the angular velocity of the high pressure compressor 15 does not exceed a threshold velocity.

It should be appreciated that in some examples, blocks 106 and 108 may be performed simultaneously. In other examples, block 108 may be initiated prior to the initiation of block 106 (that is, the second electrical machine 56 may be connected to the load 62 or to the first electrical machine 54 prior to the first electrical machine 54 accelerating the low pressure compressor 14).

At block 110, the method 100 may include determining if an exit pressure of the low pressure compressor 14 is greater than or equal to a threshold exit pressure. For example, the controller 52 may receive torque and angular velocity measurements of the low pressure compressor 14 and the high pressure compressor 15 from the sensor arrangement 60 and determine the exit pressure of the low pressure compressor 14 using the received measurements. In another example, the controller 52 may receive pressure data from a pressure sensor positioned at the exit of the low pressure compressor 14, and then determine whether the measured pressure is equal to or greater than the threshold exit pressure. In a further example, the sensor arrangement 60 may not be required for the performance of block 110 since the controller 52 may determine the torque and angular velocity of the low pressure compressor 14 and the high pressure compressor 15 from the control data for the first and second electrical machines 54, 56. In particular, the speed of the first electrical machine 54 and the second electrical machine 56 is directly related to the electrical frequency, and the torque is related to the electrical current, and the power to the current and voltage product. The determined exit pressure may be compared with a threshold exit pressure stored in the memory 66.

If the determined exit pressure is not equal to or greater than the threshold exit pressure, the method 100 returns to block 106. If the determined exit pressure is equal to or greater than the threshold exit pressure, the method 100 moves to block 112.

At block 112, the method 100 may include controlling rotation of the high pressure compressor 15 using the second electrical machine 56 to increase the angular velocity of the high pressure compressor 15. For example, the controller 52 may control the supply of electrical power to the second electrical machine 56 to enable the second electrical machine 56 to function as an electrical motor to increase the angular velocity of the high pressure compressor 15.

At block 114, the method 100 may include controlling ignition within a combustion chamber of the gas turbine engine 10. For example, the controller 52 may control a fuel pump to pump fuel to the combustion equipment 16, and may control the supply of electrical power to igniters in the combustion equipment 16 to ignite the fuel.

At block 116, the method 100 may include controlling the first electrical machine 54 and the second electrical machine 56 to function as electrical generators. For example, the controller 52 may connect the first electrical machine 54 and the second electrical machine 56 to the load 62 to enable the first electrical machine 54 and the second electrical machine 56 to supply electrical power to the load 62.

Figure 6:
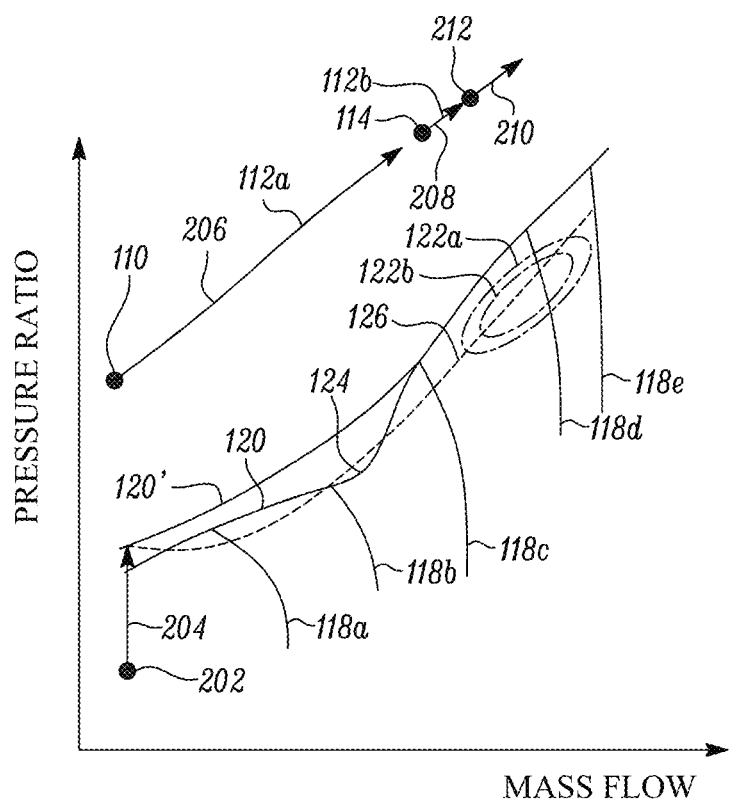
FIG. 6 illustrates an example compressor characteristic for a high pressure compressor of the engine of FIG. 1, during a start-up or re-light process.

FIG. 6 illustrates a compressor characteristic for the high pressure compressor 15, showing the relationship between the mass flow through the high pressure compressor 15 and the ratio of the pressure at the exit and entry of the high pressure compressor 15. The mass flow for a stable gas constant is given by $m\sqrt{T_{01}/p_{01}}$ where $T_{01}$ is the temperature at the entry to the high pressure compressor 15, and p is the pressure at the entry of the high pressure compressor 15.

FIG. 6 includes a number of curves 118a-e which represent the relationship between the mass flow and pressure ratio at different fixed angular velocities of the high pressure compressor 15. A first curve 118a illustrates the pressure ratio and mass flow when the high pressure compressor 15 is driven at 20% of the maximum rated speed. A second curve 118b illustrates the pressure ratio and mass flow when the high pressure compressor 15 is driven at 40% of the maximum rated speed. A third curve 118c illustrates the pressure ratio and mass flow when the high pressure compressor 15 is driven at 60% of the maximum rated speed. A fourth curve 118d illustrates the pressure ratio and mass flow when the high pressure compressor 15 is driven at 80% of the maximum rated speed. A fifth curve 118e illustrates the pressure ratio and mass flow when the high pressure compressor 15 is driven at 100% of the maximum rated speed.

At an upper end, the fixed velocity curves 118a-e are bounded by a surge line 120.

Where the operation of the engine 10 falls above the surge line 120, the flow through the high pressure compressor 15 becomes unstable and exhibits either a stall (at low speeds) or surge (at high speeds).

In one example, the low pressure compressor 14 may be arranged to provide a pressure ratio of 3:1 (at 100% of the engine rated speed), whilst the high pressure compressor may provide a pressure ratio of 30:1 (at 100% of the engine rated speed). Therefore, at lower speeds of the high pressure compressor 15, a stall or surge can occur at relatively low pressure ratios. This causes a "kink" 124 in the surge curve 120.

Typically, the most efficient operation of the engine 10 is when the high pressure compressor 15 is driven at around 80-90% of its maximum rated speed, offset below the surge line 120. FIG. 6 illustrates contours 122a,b showing the region of most efficient operation. The region within the inner contour 122b is the region of highest efficiency. Typically, during normal operation (e.g. during cruise and ascent and descent), the engine 10 is operated such that the high pressure compressor 15 has an angular velocity of more than 60% of the maximum rated speed.

When the engine 10 is started, the high pressure compressor 15 must be accelerated from stationary. FIG. 6 illustrates a typically running line 126 of the engine 10, in accordance with the method 100 illustrated in FIG. 5.

As can be seen, in the region of the kink 124, the running line 126 is above the surge line 120, and thus the engine 10 risks a stall or surge. As discussed above, one method of accommodating this is to use start bleed holes in the high pressure compressor 15, to draw air from the high pressure compressor 15, thus reducing the pressure ratio. Another method of mitigating the kink 124 is to increase the nozzle size of then engine 10, to increase the amount of air drawn through the engine 10. Both of these methods have the effect of reducing the running line 126 away from the surge line 120.

Figure 7:
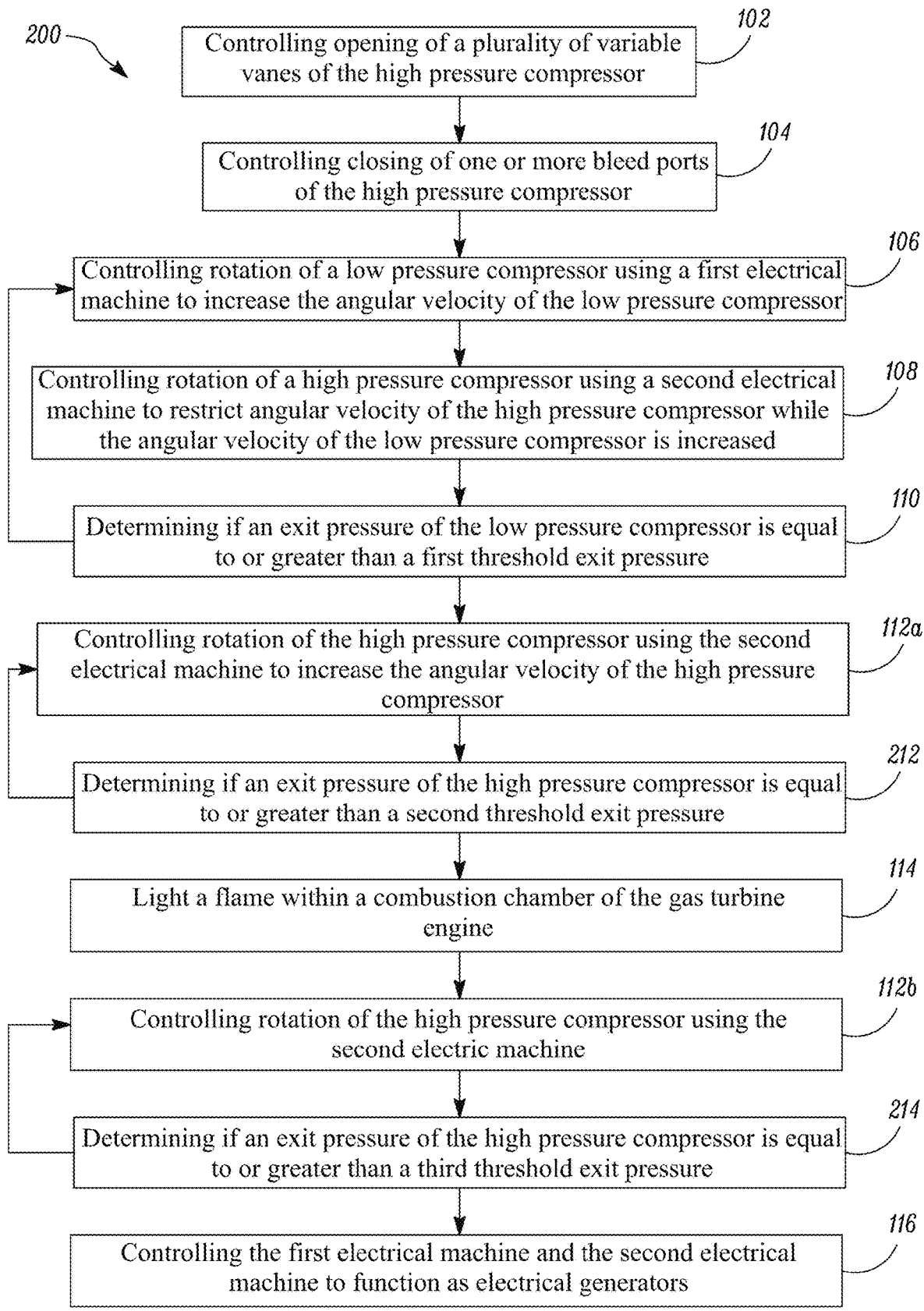
FIG. 7 illustrates a flow diagram of a method of controlling at least a part of a start-up or re-light process of a gas turbine engine according to a second example.

An alternative method of controlling the engine 10 to avoid the kink 124, in accordance with an embodiment of the disclosure, will now be discussed in relation to FIGS. 6 and 7. The method 200 illustrated in FIG. 7 is similar to the method 100 illustrated in FIG. 5 and where the blocks are similar, the same reference numerals are used.

The alternative method 200 can be split into five different stages, when considered in comparison to FIG. 6.

In a first stage 202, the method 200 may include controlling opening of a plurality of variable vanes 76 of the high pressure compressor 15 and controlling closing one or more bleed ports 78 of the high pressure compressor 15. This stage corresponds to steps 102 and 104 of the methods 100, 200 shown in FIG. 5 and FIG. 7.

In a second stage 204, the first electrical machine 54 is used to control the rotation of the first shaft 26 driving the low pressure compressor 14, whilst the second electrical machine 56 is used to restrict the rotation of the second shaft 27 driving the high pressure compressor 15. The low pressure compressor 14 is accelerated to its maximum rated speed, and held at this speed.

The operation of the second stage 204 causes the pressure in the high pressure compressor 15 to increase, without any corresponding increase in the angular velocity of the high pressure compressor 15. This corresponds to stages 106 and 108 of the methods 100, 200 shown in FIGS. 5 and 7.

At method step 110, the method 200 may include determining if an exit pressure of the low pressure compressor 14 is greater than or equal to a first threshold exit pressure. If the determined exit pressure is not equal to or greater than the threshold exit pressure, the method 200 returns to block 106. If the determined exit pressure is equal to or greater than the threshold exit pressure, the method 200 moves to the third stage 206, at block 112a.

During a third stage 206 of the start-up or relight method 200, the first electrical machine 54 and second electrical machine 56 are used to control the rotation of the first and second shafts 26, 27 to increase the angular velocity of the high pressure compressor 15 to reach a speed where the engine 10 can be ignited.

At method step 212, the method 200 may include determining if an exit pressure of the high pressure compressor 15 is greater than or equal to a second threshold exit pressure. As discussed above, these values may be directly measured by the sensor arrangement 60, or may be inferred by either other measured parameters and/or control parameters for the first and second electrical machines 54, 56.

If the determined exit pressure is not equal to or greater than the second threshold exit pressure, the method 200 returns to block 112a. If the determined exit pressure is equal to or greater than the threshold exit pressure, the method 100 moves to block 114, where a flame inside the combustion chamber 16 is ignited. The method 200 then moves to the fourth stage 208.

In the fourth stage 208 of the method 200, the first electrical machine 54 and second electrical machine 56 are used to control the angular velocity of the low pressure compressor 14 and the high pressure compressor 15 until the flame within the combustion chamber 16 is stabilised, and the operation of the engine 10 is self-sustaining. The operation of the engine 10 is self-sustaining when the compressor stages 14, 15 can be driven by only the turbine stage 17, 19 and not by the first and second electrical machines 54, 56. During this stage, the low pressure compressor 14 and the high pressure compressor 15 may be controlled to maintain constant angular velocity, continued acceleration, or deceleration, as required.

During this fourth stage 208, the turbines 17, 19 of the engine core 11 will start to be driven by the expansion of exhaust gasses. Therefore, the turbines 17, 19 will start to drive the first and second shafts 26, 27 and the compressors 14, 15. At method step 112b, the rotation of the low pressure compressor 14 and the high pressure compressor 15 is controlled using the first and second electrical machines 54, 56. As the contribution from the turbines 17, 19 increases, the contribution required from the first and second electrical machines 54, 56 is gradually reduced.

At method step 214, the method 200 may include determining if an exit pressure of the high pressure compressor 15 is greater than or equal to a third threshold exit pressure. The third threshold pressure is the pressure at which the operation of the engine can be self-sustaining without contribution from the first and second electrical machines 54, 56. As discussed above, these values may be directly measured by the sensor arrangement 60, or may be inferred by either other measured parameters and/or control parameters for the first and second electrical machines 54, 56.

If the determined exit pressure is not equal to or greater than the third threshold exit pressure, the method 200 returns to block 112b. If the determined exit pressure is equal to or greater than the third threshold exit pressure, the method 200 moves to block 116, in which the first and second electrical machines are controlled to function as generators. This forms a fifth stage 210, in which the engine has reached an idle condition and operation is self-sustained.

The control of the first and second electrical machines 54, 56 in the second stage 204 and third stage 206 of the alternative start-up process 200 can be used to ensure that the operating line 126 of the high pressure compressor 15 stays below the surge line 120, as it is accelerated. There are a number of different modes for operating the first and second electrical machines 54, 56 to achieve this.

In general, the modes of operation use the first electrical machine 54 to turn the low pressure compressor 14 to increase the pressure at the exit of the high pressure compressor 15. This allows an increased flow through the high pressure compressor, reducing the likelihood of the early stages of the high pressure compressor 15 stalling. This has the effect of increasing the pressure ratio at which a surge or stall occurs at a given mass flow, raising the surge line 120.

FIG. 6 illustrates a schematic example 120' of the effect of the different modes of operation during the second and third stages 204, 206 of the start-up process 200. As can be seen, the operating line 126 now falls below the modified surge line 120'. Thus the risk of stalling is reduced. However, because the operating line 126 is not affected, the engine 10 still operates in an efficient manner.

In a first mode of operation, the known parameters of the engine 10 can be used to ensure that the first and second electrical machines 54, 56 are controlled in a way to move the surge line 120' above the operating line 126.

The surge line 120 of an engine 10 can be determined based on the known design of an engine 10. So long as the engine 10 is manufactured within specified tolerances, all engines 10 produced in the same way will have the same surge line 120. Alternatively, the surge line 120 can be determined based on calibration or other post manufacture processes.

In either case, the second and third stages 204, 206 can be controlled on the basis of the known surge line 120 of the engine 10. In the second stage, 204, the low pressure compressor 14 is accelerated to 100% of its rated speed. It is then held at this speed until the exit pressure of the high pressure compressor 15 reaches the first threshold. At this point, the high pressure compressor 15 is quickly accelerated to 100% of its rated speed, using the second electrical machine 56.

Therefore, by correct selection of the first threshold, the first mode of operation ensures the engine 10 quickly moves across the kink 124, and the risk of stall is reduced. The first threshold should be set sufficiently high to accommodate manufacturing variation in engines 10.

In a second mode of operation, the low pressure compressor 14 is accelerated to 100% of its rated speed, during the second stage 204 of the method (steps 106 and 108 of FIG. 7). The low pressure compressor 14 is kept at this speed until the first threshold pressure is reached.

At the start of the third stage 206, the angular velocity of the low pressure compressor 14 is reduced to a first nominal speed such as, for example, 50% of the maximum rated speed. While holding the low pressure compressor 14 at this speed, the high pressure compressor 15 is then accelerated to speeds in the region of the kink 124. Both the low pressure compressor 14 and the high pressure compressor 15 are then quickly accelerated to 100% of their maximum rated speeds, and held at these speeds until the pressure ratio and mass flow in the high pressure compressor 15 is past the kink 124. The angular velocities of the compressors 14, 15 are then reduced to a second nominal speed, which may be the same as or different to the first nominal speed.

In a third mode of operation, the exit pressures of the low pressure compressor 14 and high pressure compressor 15 and the mass flows through the low pressure compressor 14 and high pressure compressor 15 are continually monitored, and provided to the controller 52. As discussed above, these values may be directly measured by the sensor arrangement 60, or may be inferred by either other measured parameters and/or control parameters for the first and second electrical machines 54, 56.

The controller 52 monitors the operating line 126 of the high pressure compressor 15 compared to the surge line 120. When the controller 52 determines that the engine is approaching the surge line 120, it takes one or more of the following mitigating actions:

- The first electrical machine 54 is controlled to maintain the low pressure compressor 14 at a constant speed (for example, 100% of the maximum rated speed), whilst the second electrical machine 56 is used to vary the angular velocity of the high pressure compressor 15 to maintain a maximum pressure differential across the high pressure compressor 15. The constant speed of the low pressure compressor 14 and the pressure differential across the high pressure compressor 15 are set to ensure the surge line 120' increases above the operating line 126.
- The first electrical machine 54 is used to reduce the angular velocity of the low pressure compressor 14, whilst increasing the angular velocity of the high pressure compressor 15. This reduces the pressure generated by the low pressure compressor 14, allowing more pressure to be generated in the high pressure compressor 15, as it is accelerated. After the operating line 126 has passed the region of the kink 124, both machines 54, 56 are operated to run the compressors 14, 15 at nominal speeds. In some examples, the first electrical machine 54 may even restrict the rotation of the low pressure compressor 14, and function as a generator.
- The second electrical machine 56 is used to operate the high pressure compressor 15 at a fixed nominal speed (e.g. 100% of the maximum rated speed), whilst the first electrical machine 54 varies the angular velocity of the low pressure compressor 14, to control the pressure drop over the high pressure compressor 15.
- The first electrical machine 54 maintains the low pressure compressor 14 at a nominal speed (e.g. 100% of the maximum rated speed) whilst the second electrical machine 56 controls the speed the high pressure compressor 15. At the same time, the actuator arrangement 58 controls the pitch of the variable inlet guide vanes to control the pressure through the engine core 11.

By each of the above methods, the air pressure in the high pressure compressor 15 can be controlled to ensure the surge line 120' is modified away from the operating line 126 of the engine 10.

In a fourth mode of operation, the first electrical machine 54 may have sufficient power to accelerate the low pressure compressor 14 to speeds at which the pressure in the high pressure compressor 15 is above the kink 124, whilst still restricting rotation of the high pressure compressor 15, in the second stage 204 of the start-up method 200.

Operating at lower temperature means the kink 124 occurs at lower speeds. Therefore, by operating at a lower temperature, and/or accelerating the low pressure compressor 14 to sufficiently high speeds (and thus pressures), the risk of stall can be avoided.

In this fourth mode, a temperature measurement of the low pressure compressor 14 is used to determine the shift of the kink 124, and thus the first threshold pressure at which to move to the second stage 206.

The first and second electrical machines 54, 56 can be used to deliver a number of features during the third stage 206 of the engine start-up method 200. For example, the start time of the engine can be reduced by controlling the machines 54, 56 to reduce the time taken in the third stage 206.

Furthermore, the power demands of an aircraft can be managed more efficiently. During start-up of an aircraft, a number of systems need power to start, in addition to the engines. If the electrical machines 54, 56 are operated in such a manner that the engines 10 require less overall power (e.g. the angular velocity of the shafts 26, 27 are reduced), then there is more power available for other systems of the aircraft. The power generated when the first and/or second electrical machines 54, 56 are operated as generators may also be used for these systems. The operation of the machines 54, 56 may also be controlled such that they switch to operating as generators when the other systems in the aircraft require power. Alternatively, two engines may be started simultaneously, rather than sequentially.

In addition, the machines 54, 56 may be used to ensure that the engine 10 quickly reaches operational conditions in which lubricants and seals operate effectively.

During the fourth stage 208 of the engine start-up process 200, ignition of the fuel-air mixture in the combustion equipment 16 should occur in a reliable manner. Ignition of the flame may involve a number of steps—firstly, a flame kernel is formed where the spark is introduced into the combustion chamber 16. The flame kernel then migrates to the face of the fuel injector closest to the spark, and stabilises at that single injector. The flame then spreads around the other fuel injectors, which are typically arranged in an annulus. Finally, the combustion of the fuel-air mixture generates sufficient heat to accelerate the engine 10.

Typically, an engine start-up process occurs on the ground. However, in some situations, it may be necessary to restart an engine 10 during flight. The processes discussed in relation to FIGS. 5, 6 and 7 can be used for an on-ground start, or a mid-flight restart. However, during a mid-flight restart, the low ambient air temperature and pressure can slow down all stages of the ignition process. To overcome this, the fuel-air mixture must have a sufficiently long residence time in the combustion chamber 16 to accommodate the low ambient air pressure.

Figure 8:
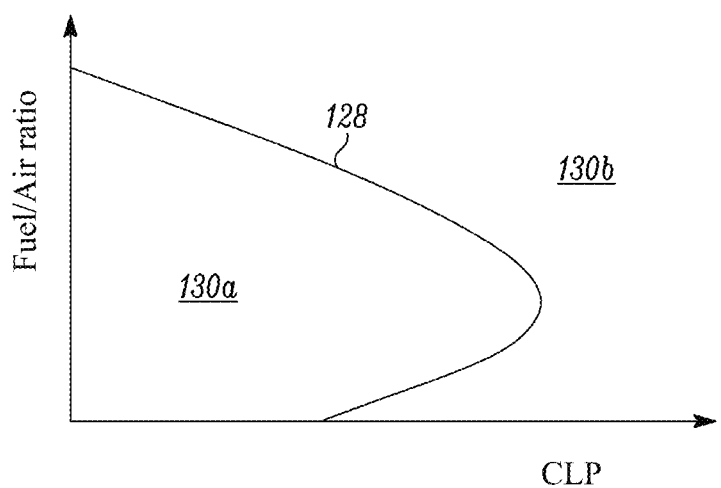
FIG. 8 illustrates a combustor loading parameter for a high pressure compressor of the engine of FIG. 1, during a start-up or re-light process.

FIG. 8 illustrates a plot that characterises the combustion chamber 16. The plot illustrates the relationship between the fuel:air ratio of the fuel delivered to the combustion chamber 16 and a characteristic of the combustion chamber known as the combustor loading parameter (CLP). A curve 128 is shown, defining the boundary between a region 130*a* of stable operation of the combustion chamber 16 (to the left of the curve) and a region 130*b* of unstable operation.

The CLP defines the ratio of the time taken for the flame reaction to occur (chemical reaction time) and the residence time of the reactants in the combustion chamber 16. It will be appreciated that for CLP>1, the flame will never sustain, and for CLP<<<1, there is a risk of flashback of the flame. It will be further appreciated that for a high ratio of fuel to air, the reaction time will be shorter than for a low ratio.

The maximum CLP for the combustor 16 occurs when the residence time is approximately equal to the reaction time, and is given by:

$$CLP = \frac{m}{p^n \times V}$$

Where m is the mass flow of the fuel mixture of the fuel mixture, p is the air pressure in the combustion chamber 16, V is the volume of the combustion chamber 16 and n is a factor that accounts for the temperature of the combustor 16. When the combustor is cold, at start-up, n is typically ~1, and n gradually increases as the combustor 16 heats up. Typically, at fully sustained operation of the engine 10, n~1.8. As n increases, the curve 128 in FIG. 8 is shifter towards higher CLP values.

The pressure p is dependent on external conditions or physical parameters of the engine 10. Similarly, the mass flow, CLP and fuel:air ratio are determined by design parameters and the operation of the compressors 14,15. Therefore, the volume is the only physical parameter of the engine 10 that can be varied to ensure the CLP enables a stall solution, and does not fall within the unstable region 130b of operation.

An engine 10 must be capable of in-flight restart. The volume required for in-flight restart is one of a number of combustor design parameters that must be taken into account when designing the engine 10. Often, the volume necessary achieve an in-flight restart is larger than the volume necessary for an on ground start or for stable operation of the engine 10. Therefore, the design point of the combustor 16 is often dependent on the volume required for in-flight restart.

Figure 9:
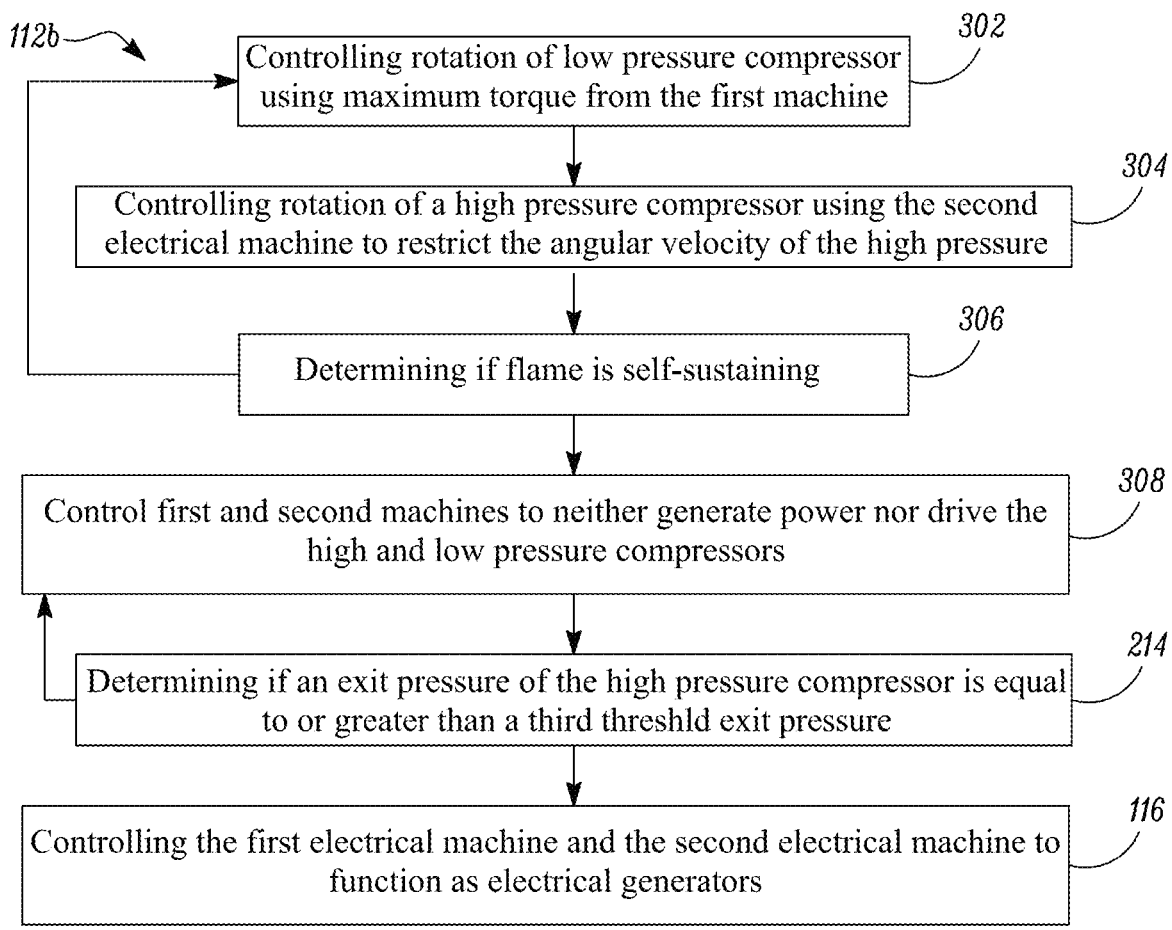
FIG. 9 illustrates a flow diagram of a method of controlling a start-up or re-light process of a gas turbine engine to stabilise a flame in the combustion chamber according to a first example.

In the fourth stage 208 of the method shown in FIG. 7, the first and second electrical machines 54, 56 may be controlled to rotate the low and high pressure compressors 14, 15 to increase the residence time of the reactants in the combustion chamber 16 by controlling the exit pressure from the low pressure compressor 14 and high pressure compressor 15 as will be described in relation to FIG. 9. FIG. 9 illustrates block 112b of the method 200 of FIG. 7 in more detail.

At a first step 302, the first electrical machine 54 is operated to apply a maximum torque (where the maximum torque is related to the maximum rated speed) to the low pressure compressor 14. At the same time, at step 304, the second electrical machine 56 is used to regulate, or limit, the speed of the high pressure compressor 15. As discussed above, this can be done by operating the second electrical machine 56 as a generator.

As the flame starts to stabilise, the combustion products drive the turbine stages 17, 19. Therefore, to maintain constant speed at the high pressure compressor, the second electrical machine 56 further limits the speed, and increasing power is generated.

At stage 306, the controller determines if the flame is self-sustaining. The flame may be determined to be self-sustaining by comparing the speed and/or torque on the electrical machines 54, 56 and/or the speed/torque on the shafts 26, 27 against pre-established limits. For example, as the input required by the electrical machines 54, 56 reduces, the flame can be determined to be self-sustaining. As discussed above, these values may be directly measured by the sensor arrangement 60, or may be inferred by either other measured parameters and/or control parameters for the first and second electrical machines 54, 56.

If the flame is not self-sustaining, the method 112b reverts to blocks 302 and 304. Otherwise, method 112b moves to block 308, where the first and second electrical machines 54, 56 are operated such that they do not provide torque to the compressors 14, 15 and they do not function as generators.

The engine 10 is then accelerated, under its own power, to an idle speed. At block 214, the method 200 determines if the engine operation is self-sustaining and the engine has reached idle speed. If not, the method reverts to block 308. Once the idle speed is reached, the first and second electrical machines 54, 56 are operated as generators, in step 116. The idle speed can be determined by measurement of the rotation speed of the shafts 26, 27.

Alternatively, both machines 54, 56 may be operated to apply maximum torque to the low and high pressure compressors 14, 15, until the idle condition of the engine 10 is reached. As the turbines 17, 19 contribute torque to the shafts 26, 27 and thus the compressors 14, 15, the contribution form the machines 54, 56 is gradually reduced, to maintain constant torque on the shafts 26, 27.

In yet a further example, the first and second electrical machines 54, 56 may be controlled to gradually reduce the torque they apply to the shaft, as the torque applied from the turbines 17, 19 increases. The gradual reduction can be controlled so that the first and second electrical machines switch to generation mode when required by the aircraft.

As in the third stage 206 of the start-up process 200, the control of the machines 54, 56 can be used to ensure a minimum start up time and to manage the power demands from the aircraft.

Furthermore, control of the fourth stage 208 can be used to reduce the volume required during an in-flight restart. By maintaining a higher flow through the compressors 14, 15 a higher pressure can be maintained in the combustor 16. Therefore, the volume required to achieve an in-flight restart is reduced. Therefore, where the volume required to achieve an in-flight restart determines the volume of the combustion chamber 16, the combustion chamber 16 can be made smaller, resulting in a reduction in weight and length of the engine.

Control of the fourth stage 208 can also allow for more efficient burning of fuel and reduction of nitrogen oxide emissions, and enable the introduction of alternative fuels, by providing enhanced mass flow, and enabling the engine 10 to operate over a wider range of fuel:air ratios.

The control of the fourth stage 208 can be used for on-ground start-up procedures, and also for on ground or in-flight restarts.

Figure 10:
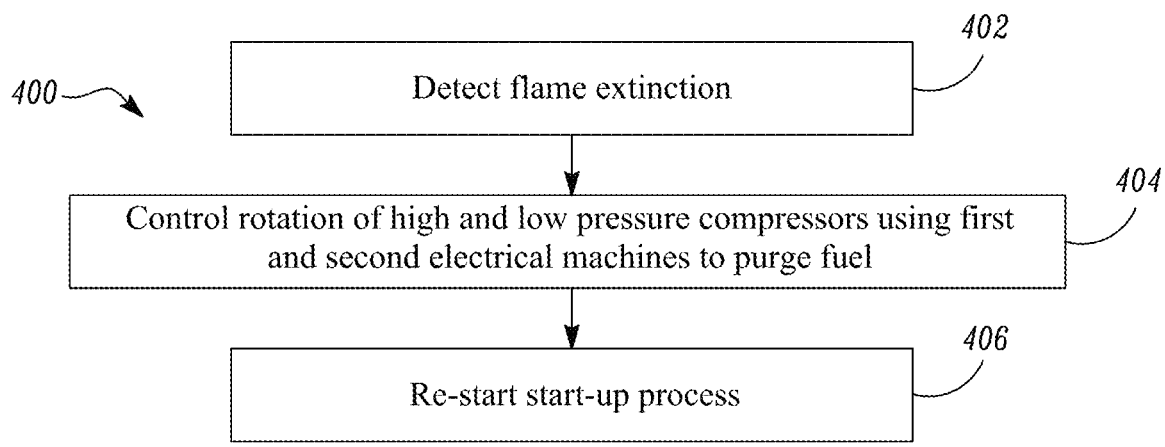
FIG. 10 illustrates a flow diagram of a method of purging a gas turbine engine after flame extinction during a start-up or re-light process of a gas turbine engine.

During the start-up or restart process, there is a risk that the flame will extinguish. This is known as flame extinction, and results in a hung start. Following a hung start, it is necessary to purge all fuel from the combustion chamber 16. FIG. 10 illustrates an example method 400 for purging residue fuel from the engine 10.

At a first stage 402, an extinction event is detected. An extinction event can be detected in a number of ways. For example, the controller 52 may detect the difference between the torque or shaft speeds with and without a flame, by reference to model measurements.

Then, at a second stage 404, the first and second electrical machines 54, 56 are operated to purge fuel from the combustion chamber 16 and turbines 17, 19. The first and second electrical machines 54, 56 may be operated to drive the compressors 14,15 at a fixed or gradually reducing speed for a period of time, to purge the fuel. In some example, the period may be a fixed period of time, dependent on when in the start-up process the flame is extinguished. In other examples, sensors may detect fuel content at the exhaust, and the period of time may be determined based on the sensor readings.

During this period, the first and second electrical machines 54, 56 are also operated such that the speed of the shafts 26, 27 do not drop below a speed at which windmilling occurs. The first and second electrical machines 54, 56 maintain the speed above this minimum threshold until the start-up process is restarted, and the shafts 26, 27 are once again accelerated.

Finally, at a third stage 406, the start-up process is re-initialised. The re-initialised process will proceed in the same manner as discussed above.

The method 400 ensures that the restart process can be operated more efficiently. Maintaining the angular velocity of the shafts 26, 27 means that it may not be necessary to restart the complete process.

Furthermore, the period of the start-up process in which a shutdown and re-light procedure may be started without having to complete shutdown the engine 10 is extended.

For example, the first and second electrical machines 54, 56 may maintain the speed of the shafts 26, 27 such that the high pressure compressor 15 is kept at operational conditions above the kink 124 shown in FIG. 6. This then speeds up the restart process. Furthermore, the extra flexibility in the design of the combustor 16 enables restarts to occur at high altitude, in flight, by maintaining mass-flow (and thus fuel:air ratio) through the combustor 16.

Figure 11:
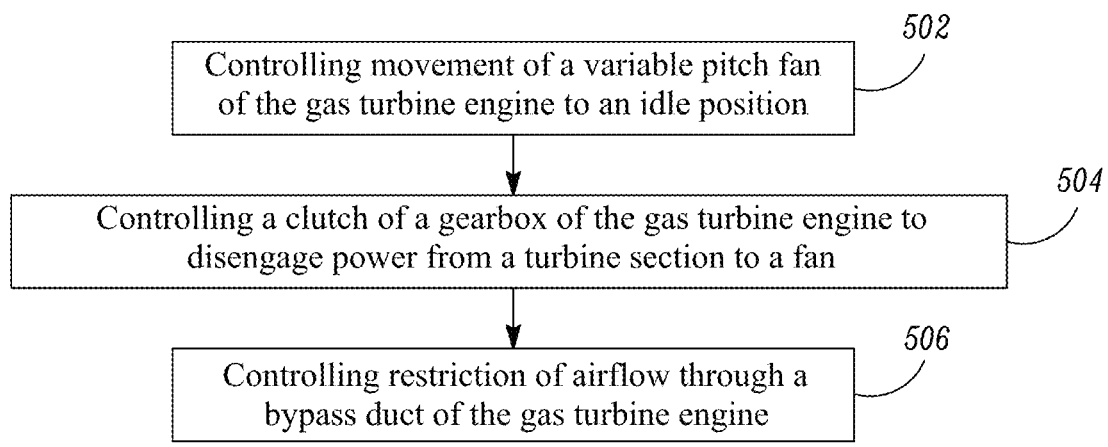
FIG. 11 illustrates a flow diagram of a further method steps that may be incorporated in the methods of FIG. 5 or FIG. 7.

FIG. 11 illustrates a flow diagram of further additional blocks 502, 504, 506 that may be included in the method of FIG. 5 or FIG. 7. Blocks 502, 504 and 506 may be performed in any order and may be performed at any time prior to block 112 or block 112*a*. Any one of the blocks or more of the blocks may be omitted.

At block 502, the method 100, 200 may include controlling movement of a variable pitch fan of the gas turbine engine to an idle position. For example, the controller 52 may control a servo motor of the actuator arrangement 58 to change the pitch of the fan 23 to an idle position.

At block 504, the method 100, 200 may include controlling a clutch of a gearbox of the gas turbine engine to disengage power transmission from a turbine section to a fan. For example, the controller 52 may control the clutch 74 to disengage the fan 23 from the low pressure turbine 19.

At block 506, the method 100, 200 may include controlling restriction of airflow through a bypass duct of the gas turbine engine. For example, the controller 52 may control the actuator arrangement 58 to move a member (such as a vane) to restrict the airflow B within the bypass duct 22 of the gas turbine engine 10.

The apparatus 50 and the methods 100 described above may provide several advantages, in addition to the benefits discussed above.

First, the driving of the low pressure compressor 14 and the restriction of the high pressure compressor 15 by the first and second electrical machines 54, 56 at blocks 106 and 108 respectively may reduce the impact of induced drag in the high pressure compressor 15 and may thus prevent the downstream stages of the high pressure compressor 15 from choking, and the upstream stages of the high pressure compressor 15 from stalling and surging. This may enable the use of the start bleed of the gas turbine engine 10 to be minimized or eliminated.

In some examples, the use of the apparatus 50 and the methods 100 described above may enable the manufacture of a gas turbine engine comprising a high pressure compressor without a start bleed.

Second, the opening of the vanes 76 and the closing of the bleed ports 78 in the high pressure compressor 15 may assist in the increase of pressure at the exit of the low pressure compressor 15/the entrance to the high pressure compressor 15.

Third, the use of the first and second electrical machines 54, 56 as electrical generators may advantageously supply electrical power to the electrical network 62 during start-up of the gas turbine engine 10.

The additional blocks 502, 504, 506, illustrated in FIG. 11 may be advantageous in that blocks 502, 504 and 506 may reduce aerodynamic drag on the low pressure compressor 14 and may thus assist with the increase in pressure at the exit of the low pressure compressor 14/the entrance to the high pressure compressor 15 during the start-up or the re-light process.

In the examples discussed above, the apparatus 50 includes a single first electrical machine 54 to control rotation of the low pressure compressor 14 and a single second electrical machine 56 to control rotation of the high pressure compressor 15.

It will be appreciated that in some examples, the apparatus 50 may include redundancy, and may include two or more first electrical machines 54, and two or more second electrical machines 56. It may be that each first electrical machine 54 and each second electrical machine 56 is capable of controlling the operation of the low pressure compressor 14 and high pressure compressor 15 without input from the other machines 54, 56. Thus if one of the machines breaks, the engine 10 can still start.

In some examples, two or more first electrical machines 54 or two or more second electrical machines 56 may operate together when high torque is required. However, it may be that whilst multiple machines 54, 56 can be used to start the engine 10, the process can still be operated by a single first electrical machine 54, and a single second electrical machine 56, if necessary.

In the above examples the first electrical machine 54 and second electrical machine 56 are used as generators, when they are required to restrict rotation of the low pressure compressor 14 and high pressure compressor 15. This is by way of example, and the rotation of the compressors 14, 15 may be restricted without using the first and second electrical machines 54, 56 as generators. Furthermore, the first and second machines 54, 56 need not be used as generators at all.

In the above methods, it will be assumed that where a measured parameter is measured against a threshold, an instantaneous measurement may be used to determine the parameter is above the threshold. Alternatively, the parameter may only be determined to be above the threshold after it has remained above the threshold for a fixed period.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

In the preceding description, the terms 'connected' and 'coupled' mean operationally connected and coupled. It should be appreciated that there may be any number of intervening components between the mentioned features, including no intervening components.

For example, the controller 52 may receive torque and angular velocity measurements of the low pressure compressor 14 and the high pressure compressor 15 from the sensor arrangement 60 and determine the exit pressure of the high pressure compressor 15 using the received measurements. In another example, the controller 52 may receive pressure data from a pressure sensor positioned at the exit of the high pressure compressor 15, and then determine whether the measured pressure is equal to or greater than the second threshold exit pressure. In a further example, the sensor arrangement 60 may not be required for the performance of block 110 since the controller 52 may determine the torque and angular velocity of the high pressure compressor 15 and the high pressure compressor 15 from the control data for the first and second electrical machines 54, 56. In particular, the speed of the first electrical machine 54 and the second electrical machine 56 is directly related to the electrical frequency, and the torque is related to the electrical current, and the power to the current and voltage product. The determined exit pressure may be compared with a threshold exit pressure stored in the memory 66.

We claim:

1. A method of controlling at least part of a start-up or re-light process of a gas turbine engine, the method comprising:
   controlling ignition within a combustion chamber of the gas turbine engine;
   controlling rotation of a low pressure compressor using a first electrical machine, and controlling rotation of a high pressure compressor using a second electrical machine, the combustion chamber downstream of so the low pressure compressor and high pressure compressor;
   determining if an exit pressure of the high pressure compressor is equal to or greater than a self-sustaining threshold pressure; and
   in response to determining that the exit pressure of the high pressure compressor is equal to or greater than the self-sustaining threshold pressure, ceasing controlling rotation of the low pressure compressor using the first electrical machine, and/or the high pressure compressor using a second electrical machine, such that operation of the gas turbine engine is sustained by air drawn through the gas turbine engine.

2. The method of claim 1, wherein the rotation of the low pressure compressor and the high pressure compressor is controlled to increase a residence time of fuel in the combustion chamber.

3. The method of claim 1, wherein controlling rotation of the low pressure compressor using the first electrical machine, and controlling rotation of the high pressure compressor using the second electrical machine comprises:
   applying a maximum torque to the low pressure compressor from the first electrical machine.

4. The method of claim 3, wherein controlling rotation of the low pressure compressor using the first electrical machine, and controlling rotation of the high pressure compressor using the second electrical machine further comprises:
   restricting rotation of the high pressure compressor using the second electrical machine.

5. The method of claim 4, wherein rotation of the high pressure compressor is, at least in part, driven by expansion of combustion products from the combustion chamber through a turbine, the turbine driving a shaft interconnecting the turbine and the high pressure compressor.

6. The method of claim 4, wherein controlling rotation of the low pressure compressor using the first electrical machine, and controlling rotation of the high pressure compressor using the second electrical machine comprises:
   after applying maximum torque to the low pressure compressor:
   determining a flame is self-sustaining in the combustion chamber; and
   controlling the first and second electrical machines to neither drive the low pressure compressor or high pressure compressor nor function as generators.

7. The method of claim 3, wherein controlling rotation of the low pressure compressor using the first electrical machine, and controlling rotation of the high pressure compressor using the second electrical machine further comprises:
   applying a maximum torque to the high pressure compressor from the second electrical machine.

8. The method of claim 1, comprising, in response to determining that the exit pressure of the high pressure compressor is equal to or greater than the self-sustaining threshold pressure, operating the first and/or second electrical machines as generators.

9. The method of claim 8, wherein:
   the high and low pressure compressors are driven by respective high and low pressure turbines;
   the turbines are driven by expansion of combustion products from the combustion chamber; and
   the method further comprises reducing the torque applied by the first and second electrical machines as the torque applied by the high and low pressure turbines increases.

10. The method of claim 1, comprising monitoring one or more engine parameters during the method, the one or more engine parameters selected from a list comprising at least:
    an entry pressure of the low pressure compressor;
    an exit pressure of the low pressure compressor;
    an entry temperature of the low pressure compressor;
    an exit temperature of the low pressure compressor;
    an entry pressure of the high pressure compressor;
    the exit pressure of the high pressure compressor;
    an entry temperature of the high pressure compressor; and
    an exit temperature of the high pressure compressor.

11. The method of claim 10, wherein controlling rotation of the low and high pressure compressor using the second electrical machine comprises:
    varying an angular velocity of the high and/or low pressure compressor based in at least one of the one or more engine parameters.

12. The method of claim 1, the method comprising at least part of a re-light procedure at an altitude above sea level, during flight.

13. A non-transitory computer readable storage medium comprising computer readable instructions that, when read by a computer, cause performance of the method as claimed in claim 1.

14. An apparatus for controlling the at least part of the start-up or the re-light process of the gas turbine engine, the apparatus comprising a controller configured to perform the method of claim 1.

* * * * *